(12) United States Patent
Lim et al.

(10) Patent No.: US 10,621,734 B2
(45) Date of Patent: Apr. 14, 2020

(54) METHOD AND SYSTEM OF TRACKING AN OBJECT BASED ON MULTIPLE HISTOGRAMS

(71) Applicant: SOGANG UNIVERSITY RESEARCH FOUNDATION, Seoul (KR)

(72) Inventors: Jaechan Lim, Busan (KR); Hyung Min Park, Seoul (KR)

(73) Assignee: SOGANG UNIVERSITY RESEARCH FOUNDATION, Seoul (KR)

(*) Notice: Subject to any disclaimer, the term of this patent is extended or adjusted under 35 U.S.C. 154(b) by 153 days.

(21) Appl. No.: 16/020,204

(22) Filed: Jun. 27, 2018

(65) Prior Publication Data

US 2019/0005655 A1 Jan. 3, 2019

(30) Foreign Application Priority Data

Jun. 29, 2017 (KR) .................. 10-2017-0082308

(51) Int. Cl.
| | | |
|---|---|---|
| G06K 9/00 | (2006.01) | |
| G06T 7/246 | (2017.01) | |
| G06T 7/73 | (2017.01) | |
| G06K 9/46 | (2006.01) | |

(52) U.S. Cl.
CPC ............ G06T 7/248 (2017.01); G06K 9/4647 (2013.01); G06T 7/74 (2017.01); G06T 2207/10016 (2013.01); G06T 2207/20072 (2013.01)

(58) Field of Classification Search
CPC . G06T 7/248; G06T 7/74; G06T 2207/10016; G06T 2207/20072; G06K 9/4647

USPC ........................................................ 382/103
See application file for complete search history.

(56) References Cited

U.S. PATENT DOCUMENTS

| | | | | |
|---|---|---|---|---|
| 7,177,447 | B2* | 2/2007 | Olson ................. | G06K 9/6203 382/103 |
| 8,400,619 | B1* | 3/2013 | Bachrach ................ | G01C 1/04 356/4.01 |
| 8,923,401 | B2* | 12/2014 | Robinson ............... | H04N 19/46 375/240.16 |
| 9,230,333 | B2* | 1/2016 | Robinson ................. | G06T 9/00 |
| 9,294,755 | B2* | 3/2016 | Robinson ............ | H04N 13/221 |
| 9,372,070 | B1* | 6/2016 | Jancic ................. | G01B 11/026 |
| 9,733,081 | B2* | 8/2017 | Zimmermann .......... | G01C 7/00 |
| 9,794,483 | B1* | 10/2017 | Robinson ........... | H04N 5/23248 |

(Continued)

FOREIGN PATENT DOCUMENTS

| | | |
|---|---|---|
| KR | 20140052256 | 5/2014 |
| KR | 101517359 | 6/2015 |
| KR | 101635973 | 7/2016 |

*Primary Examiner* — Marceau Milord
(74) *Attorney, Agent, or Firm* — Cantor Colburn LLP

(57) ABSTRACT

Provided are an object tracking method and an object tracking system. The object tracking method uses a particle filter configured by combining a Minimax estimation technique with a Monte Carlo sampling method. In the object tracking method, for each of the particles, a feature having a maximum cost among measurement values of at least two or more features is selected, a weight for the particle is calculated by using the measurement value of the selected feature, and a position of the target, object in the frame is estimated by using the weight of each of the candidate particles.

8 Claims, 8 Drawing Sheets

(56) References Cited

U.S. PATENT DOCUMENTS

| | | | |
|---|---|---|---|
| 9,805,264 B2* | 10/2017 | Kuznetsova | G06K 9/00711 |
| 10,382,701 B2* | 8/2019 | Keller | G01S 7/4818 |
| 2005/0099637 A1* | 5/2005 | Kacyra | G01B 11/002 |
| | | | 356/601 |
| 2006/0188169 A1* | 8/2006 | Tener | G06T 5/20 |
| | | | 382/254 |
| 2008/0174762 A1* | 7/2008 | Liu | G01S 7/4814 |
| | | | 356/5.09 |
| 2009/0147994 A1* | 6/2009 | Gupta | G06K 9/00295 |
| | | | 382/103 |
| 2009/0260511 A1* | 10/2009 | Melnychuk | F41G 3/147 |
| | | | 89/1.11 |
| 2010/0150401 A1* | 6/2010 | Kizuki | G06T 7/277 |
| | | | 382/103 |
| 2010/0296697 A1* | 11/2010 | Ikenoue | H04N 7/18 |
| | | | 382/103 |
| 2010/0328644 A1* | 12/2010 | Lu | G01S 7/4802 |
| | | | 356/5.01 |
| 2016/0110610 A1* | 4/2016 | Ikenoue | G06T 7/248 |
| | | | 382/103 |

\* cited by examiner

METHOD AND SYSTEM OF TRACKING AN OBJECT BASED ON MULTIPLE HISTOGRAMS

BACKGROUND OF THE INVENTION

1. Field of the Invention

The present invention relates to an object tracking method and an object tracking system using the object tracking method, and more particularly, to an object tracking method and apparatus being robust to an environment by multiple histograms for at least two or more features for a localized target object, selecting a feature having a maximum cost among the features, applying a particle filter to perform object tracking.

2. Description of the Related Art

In recent years, with the advent of personalized media, interest and support for personalized broadcasting services have spread rapidly in the field of broadcasting and communication media.

Traditionally, an object tracking technique in a video by using a fixed or mobile camera has been actively studied in the field of computer vision science. The object tracking technique has been used for security and public services in a variety of applications such as prevention and detection of crime and disasters by using indoor and outdoor closed-circuit television (CCTV) and for analysis of games in the field of sports. In the above-mentioned object tracking technique, generally, a motion of an object, existing in a video captured by a fixed camera is tracked, or in the case where a video is captured by a mobile camera, a three-dimensional motion of the camera and a motion of the object are simultaneously tracked. In general, a position of a specific object, or positions of an unspecified number of objects are estimated for every frame in a video sequence captured by the camera.

The object tracking technique requires two key techniques in computer vision. One technique is "detection", and the other technique is "tracking". The detection is to detect an object which is to be detected in an image. The tracking is to track a change in position of a specific object in an image. The tracking algorithms are classified into two major algorithms. One major algorithm relates to the case (1) where the detection is only used for initialization, and thereafter, the estimation of the motion of the object according to time depends on tracking of a change according to a flow of the motion of the object, without detection; and the other major algorithm relates to the case (2) where the detection is performed every frame, and the tracking is performed by matching between the objects on detection results for each frame (tracking by detection).

In general, in a tracking method, for the detection, a background image that does not include a person is modeled, and then, a difference between a current camera input image and the background image is obtained to detect a motion region. In this case, since the number of detection areas and the number of tracking objects may be different due to crossing or overlapping of persons, a robust, enhanced matching technique is needed so that the tracking is maintained for each person. Feature information extracted for use in the tracking process includes color, edge, optical flow, texture, and the like. Depending on the algorithm, various features are combined and used. As an algorithm for detecting features, there may be exemplified Kanade-Lucas-Tomasi Feature Tracker (KLT), Scale Invariant Feature Transform (SIFT), Histogram of Orientation Gradients (HOG), Haar features, Ferns, Local Binary Pattern (LBP), Modified Census Transform MCT), and the like.

The tracking algorithm is divided into point-based tracking, kernel-based tracking, and silhouette-based tracking depending on the type of feature. The kernel-based tracking tracks the conversion process according to an appearance of an object. The silhouette-based tracking uses edge information of an object to perform tracking depending on whether or not contours match. The point-based tracking, in which the features of the detected object are expressed in a form of points, uses a Kalman filter method and a particle filter method in order to track correlation of the points.

Unlike the object tracking method using mean-shift or Kalman filter, an object tracking method using a particle filter algorithm exhibits robust performance with respect to temporal overlapping, occlusion, and background clutter. In particular, the object tracking methods using color histogram information are robust to illumination change; and even in the case of low-resolution objects with few features, the tracking is performed with relatively high accuracy.

The Sequential Monte-Carlo technique, also called particle filtering, is a method of performing the tracking by modeling a kinetic motion of a target, sampling multiple images of the target in an expected path, obtaining a weight of each sample, and obtaining an expectation value thereof. At this time, a basic measure in obtaining the weights of the samples is a histogram by RGB (red, green, and blue). The measure represents a degree of histogram similarity created by strengths of colors of image pixels constitute a target to be tracked. As the degree of histogram similarity is larger, it is determined that the target is more similar. In the existing methods, the histogram may be configured by HSV (hue, saturation, and brightness) besides the RGB.

The particle filter expresses a state of a particle as a set of samples having weight information (sample importance). That is, a probability distribution of object positions is approximated to samples with weights. A sequence of processes of the particle filter after state initialization is: (1) predicting a current position from previous measurement, (2) updating an importance weight from a current measurement value, and (3) mainly resampling particles having high likelihood among the particles. This sampling is called sequential importance sampling (SIS). The above-mentioned three processes are repeated to predict the object position by using resampled particles. It has been known that the particle filter tracking method is robust to a sudden change in object motion and has excellent tracking performance.

However, in applying the particle filter tracking to the object tracking methods in the related art, a single histogram may be used, or two or three histograms may be applied in a joint probability manner. On the other hand, in a moving picture, various environmental changes occur according to time. The various environmental changes include occurrence of an illumination phenomenon or shade, a change in brightness, and the like. In this case, in the object tracking method in the related art using the particle filter tracking method, accurate object, tracking cannot be performed.

SUMMARY OF TEE INVENTION

The present invention is to provide an object tracking method using multiple histograms, which can perform object tracking robustly even in a changing environment.

The present invention is also to provide an object tracking system to which the above-described object tracking method using multiple histograms is applied.

According to a first aspect of the present invention, there is provided an object tracking method for tracking a target object set in advance from a moving picture including consecutive frames, including steps of: (a) detecting the target object to foe tracked by target localization in a reference frame of the moving picture, identifying particles corresponding to the detected target object, and measuring multiple histograms for at least two or more predetermined features; (b) generating a plurality of candidate particles in a frame for tracking the target, object; (c) for each of the candidate particles, generating multiple histograms by obtaining measurement values for the at least two or more predetermined features, selecting a feature having a maximum cost among the measurement values for each feature by using the multiple histograms, and calculating a weight for the particle by using the measurement value of the selected feature; and (d) estimating a position of the target object in the frame by using the weights of all candidate particles obtained in the step (c).

In the object tracking method according to the first aspect, it is preferable that the step (c) includes, for each of the candidate particles, steps of: (c1) generating the multiple histograms by obtaining the measurement values for at least two or more predetermined features; (c2) selecting the feature having the maximum cost among the at least two or more features by applying a Minimax estimation technique by using the multiple histograms for the at least two or more features; and (3) calculating the weight for the particle by using the selected feature, wherein the weights for all the candidate particles are calculated and provided.

In the object tracking method according to the first aspect, it is preferable that in the step (c2), a Bhattacharyya Distance (BD) between a histogram of the particle in the reference frame and a histogram of the candidate particle in the frame to be tracked is obtained for each of the at least two or more features, and the feature having a maximum BD value among the at least two or more features is selected as the feature having the maximum cost; and in the step (c3), the weight of the particle is obtained by using the BD value of the selected feature.

According to a second aspect of the present invention, there is provided an object tracking system for tracking a target object set in advance from a moving picture including consecutive frames, including: an input module which receives, as an input, the moving picture to be tracked and sets the target object to be tracked; a reference frame measurement module which sets a reference frame of the moving picture input from the input module, detects the target object to be tracked by target localization in the reference frame of the moving picture, identifies the particles corresponding to the detected target object, measures multiple histograms for at least two or more predetermined features for the particles; a particle weight measurement module which selects a frame for tracking the target object from the moving picture, generates a plurality of candidate particles from the selected frame, generates multiple histograms by obtaining measurement values for the at least two ox more predetermined features for each of the candidate particles, selects a feature having a maximum cost among the measurement values for each of features by using the multiple histograms, and, calculates a weight of the particle by using the measurement value of the selected feature; and an object position estimation module which estimates a position of the target object in the frame by using the weights of ail the candidate particles measured by the particle weight measurement module.

In the object tracking system according to the second aspect, it is preferable that, for each of the candidate particles, the particle weight measurement module: generates the multiple histograms by obtaining the measurement value for at least two or more predetermined features; selects the feature having the maximum cost among the at least two or more features by applying a Minimax estimation technique by using the multiple histograms for the at least two or more features; and calculates the weight of the particle by using the selected feature.

In the object tracking system according to the second aspect, it is preferable that, the particle weight measurement module; obtains a Bhattacharyya Distance (BD) between a histogram of the particle in the reference frame and a histogram of the candidate particle in a frame to be tracked for each of the at least two or more features, and selects a feature having a maximum BD value among the at least two or more features as a feature having a maximum cost, and obtains the weight of the particle by using the BD value of the selected feature.

In the object tracking system according to the second aspect of the invention, the Bhattacharyya distance (BD) for a given feature $n_m$ is defined as a value obtained by squaring a Bhattacharyya Similarity (BS) coefficient.

In an object tracking method using multiple histograms according to the present invention, a Minimax estimation technique in multiple histograms is applied, and a particle filter is applied by using a histogram for selected one feature, so that it is possible to perform object tracking which is robust to various environmental changes such as occurrence of an illumination phenomenon or shade and a change in brightness according to time, In addition, in the object tracking method using multiple histograms according to the present invention performance of tracking states of position, speed, size, and the like is greatly improved as compared with object tracking methods in the related art.

In Particular, in the object tracking method according to the present invention, as the image quality of a video image is lower, the tracking of a target object can be performed more accurately.

Meanwhile, the object tracking method according to the present, invention can be applied not only to a single object tracking but also to multiple-object tracking by performing an initial localization process.

DESCRIPTION OF THE PREFERRED EMBODIMENTS

An object tracking method according to the present invention uses a particle filter configured by combining a Minimax estimation technique with a Monte Carlo sampling method. In the object tracking method, for each of the particles, a feature having a maximum cost among measurement values of at least two or more features is selected, and a weight for the particle is calculated by using the measurement value of the selected feature.

Hereinafter, an object tracking method according to a preferred embodiment of the present invention and an object tracking system using the object tracking method will be described in detail with reference to the accompanying drawings. The object tracking method according to the preferred embodiment of the present invention tracks a target object set in advance from a moving picture including consecutive frames.

Figure 1:
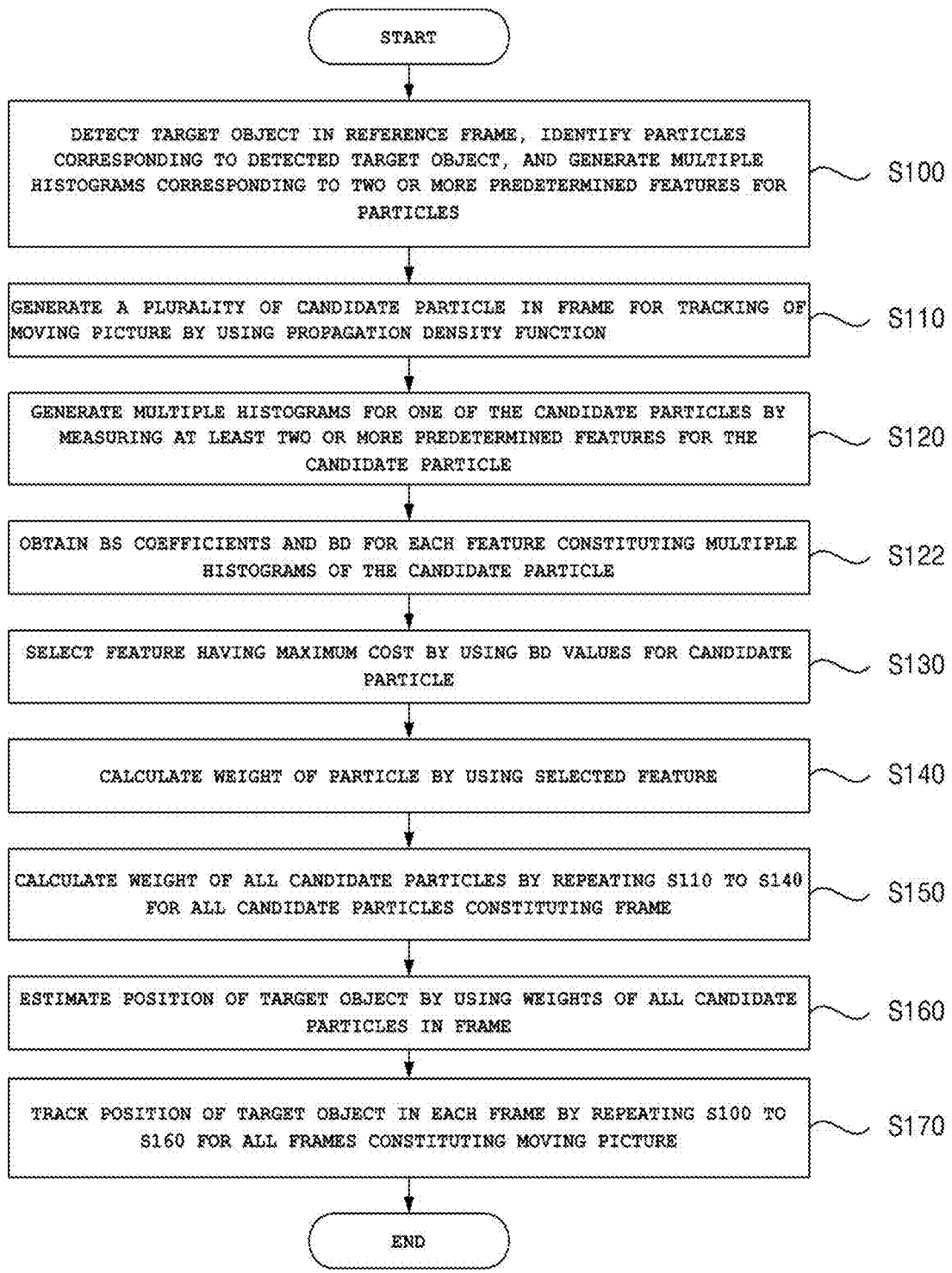
FIG. 1 is a flowchart sequentially illustrating an object tracking method according to a first embodiment of the present invention.

FIG. 1 is a flowchart sequentially illustrating the object tracking method according to the preferred embodiment of the present invention.

Referring to FIG. 1, in an object tracking method according to the embodiment of the present invention, first, a target object to be tracked is detected by target localization in a reference frame of the moving picture, the particles corresponding to the detected target object, are allowed to be identical to each other and multiple histograms corresponding to the respective particles are generated by measuring at least two or more predetermined features so that multiple histograms for the particles are generated (step 100). At this time, if, is preferable that an initial frame of the moving picture is mainly set to the reference frame. The at least two or more predetermined features may include RGB, HSV, HOG, and the like. In the case of generating a histogram by measuring one feature with respect, to pixels constituting the localized target object, the generated histogram may have a plurality of bins, and a height H of the histogram may be expressed by Mathematical Formula 1.

$$H = \{h_b\}_{b=1,\ldots,N_b} \quad \text{[Mathematical Formula 1]}$$

Herein, b is a bin number. $N_b$ is the total number of bins. $h_b$ is the height of a histogram for a bin. The total number of bins may be changed according to a type of measure. It is preferable to normalize the total number of bins so that a sum of the values of histograms becomes 1.

The histogram of the target object localized in the reference frame is defined as expressed in Mathematical formula 2, and in the case where there are several features as a measure, the histogram of the target object can be expressed in Mathematical Formula 3.

$$H_k^R = \{h_{b,k}^R\}_{b=1,\ldots,N_b} \quad \text{[Mathematical Formula 2]}$$

Multiple histograms for all the features including at least two or more features for the k-th frame can be represented by $m_k$ in Mathematical Formula 3.

$$m_k = \{m_{k,n_m}\}_{n_m=1}^{N_m}$$
$$= \{H_{k,n_m}^R\}_{n_m=1}^{N_m} \quad \text{[Mathematical Formula 3]}$$

Herein, k represents the order of frames of the moving picture, $n_m$ represents the serial number of the histogram feature, and represents the total number of features used.

Next, the frame for tracking the target object is selected from the moving picture, and a plurality of candidate particles are generated in the selected frame by using a propagation density function (step 110).

Next, for one of the plurality of candidate particles, multiple histograms for the corresponding candidate particle are generated by measuring at least two or more predetermined features (step 120). Then, for each of the features constituting the multiple histograms of the corresponding candidate particle, Bhattacharyya similarity (hereinafter, referred to as 'BS') coefficients are obtained, and a Bhattacharyya distance (hereinafter, referred to as 'BD') defined by a value obtained by squaring the BS coefficient is obtained (step 122).

According to the definition of Mathematical Formula 3, for each feature, that is, for a given $n_m$, the BS coefficient $\mathcal{B}_{n_m}$ is defined by Mathematical Formula 4.

$$\mathcal{B}_{n_m}(H_{n_m}^R, H_{n_m}) = \left[1 - \sum_{b=1}^{N_b} \sqrt{h_{b,n_m}^R h_{b,n_m}}\right]^{\frac{1}{2}} \quad \text{[Mathematical Formula 4]}$$

Herein, $H_{n_m}^R$ is a histogram of the feature $n_m$ for the reference frame. $H_{n_m}$ is a histogram of the feature $n_m$ for the frame to be tracked.

On the other hand, the BD value has a value in a range of 0 to 1. As a degree of similarity is larger, the BD value is close to 0 and as the degree of similarity is smaller, the BD value is close to 1.

Next, for the particle, the cost for the at least two or more features is defined as the BD values, and a feature having a maximum cost among the costs for the at least two or more features is selected (step 130). In this case, in the present invention, in order to measure weights for the features of the particle, a solution is obtained by a Minimax method. As one of estimation techniques, the Minimax method is a method of, first, defining a risk factor, maximizing the defined risk factor, and selecting a solution of minimizing the maximized risk factor as an estimation value. Therefore, in order to obtain the solution by the Minimax method, first, the risk factor is defined; in order to maximize the defined risk factor, the possible maximum value is found for the risk factor; and then, in order to select the solution of minimizing the maximized risk factor as an estimation value, the maximum value is minimized again.

Herein, the solution by the Minimax method is to find a solution of minimizing the possible maximum risk factor again as expressed in Mathematical Formula 5.

$$\inf \sup \{Risk\} \quad \text{[Mathematical Formula 5]}$$

Herein, "inf" denotes a minimum value as infimum, and sup denotes a maximum value as supremum.

In the particle filter, the value of the risk function is defined by Mathematical Formula (6).

[Mathematical Formula 6]

$$\mathcal{R}_k^{PF} = \sum_{i_p=1}^{N} \left[ \left( s_k^{i_p} - \hat{s}_k \right)^2 \omega_k^{i_p} \right]$$

Herein, N is a total number of pixels used, $s_k^{i_p}$ is a state value for an ip-th particle in a k-th frame, $\hat{s}_k$ is a state estimation value in the k-th frame, and $w_k^{i_p}$ is a weight of the corresponding particle, which is expressed as a function of BD values.

[Mathematical Formula 7]

$$\omega_k^{i_p} \propto \exp\left[ -20 \cdot \sum_{m=1}^{N_m} \left( \mathcal{B}_m^{i_p\,2} \right) \right]$$

Herein, if one BD value is selected to maximize the value of the risk function, the weight of the particle is corrected as expressed in Mathematical Formula 8.

$$w_k^{i_p} \propto \exp[-20 \cdot (\mathcal{B}_{max}^{i_p\,2})]$$   [Mathematical Formula 8]

Herein, $\mathcal{B}_{min}^{i_p\,2}$ satisfies a condition according to Mathematical Formula 9.

$$\mathcal{B}_{max}^{i_p\,2} = \max\{ \mathcal{B}_1^{i_p\,2}, \mathcal{B}_2^{i_p\,2}, \ldots, \mathcal{B}_{N_m}^{i_p\,2} \}$$   [Mathematical Formula 9]

The Minimax state estimated value obtained at this time is expressed by Mathematical Formula 10.

[Mathematical Formula 10]

$$\hat{s}_k^{MINIMAX} \propto \sum_{i_p=1}^{N} \left[ \exp\left( -20 \cdot \mathcal{B}_{max,k}^{i_p\,2} \right) \cdot s_k^{i_p} \right]$$

Since the weight values are changed according to Mathematical Formulas 7 and 8, the value of the risk function in Mathematical Formula 6 is changed. The graph of FIG. 4 described later is a graph of an average value of the values of the risk function expressed by Mathematical Formula 6.

As a result, in the proposed method, the feature that maximizes the BD value is selected, and the selected BD is used as a measure when the weight of each particle in the particle filtering (PF) is obtained.

For all candidate particles constituting the selected frame in step 110, the above-described steps 120 to 140 are repeated to calculate the weight for each candidate particle constituting the frame (step 150).

Next, by using the weights of all the candidate particles constituting the frame, normalization is performed so that a sum of the weights is equal to 1 so as to have a weighting factor corresponding to the weight. And then, the position of the target object is estimated in the frame (step 160).

The process of performing normalization so that the sum of the weights for the above-described particles is equal to 1 can be expressed by Mathematical Formula 11.

$$\Sigma_{i_p=1}^{N} w_k^{i_p} = 1$$   [Mathematical Formula 11]

The above-described steps 110 to 160 are repeated for all the frames constituting the moving picture, so that the change in position of the target object in the moving picture is tracked.

The remaining contents of the algorithm used in the object tracking method according to the present invention is the same as those of a sequential importance resampling particle filtering method in the related art, and resampling is performed in an image frame every time.

Hereinafter, a configuration and operation of an object tracking system implementing the above-described object tracking method will be described in detail with reference to FIG. 2.

Figure 2:
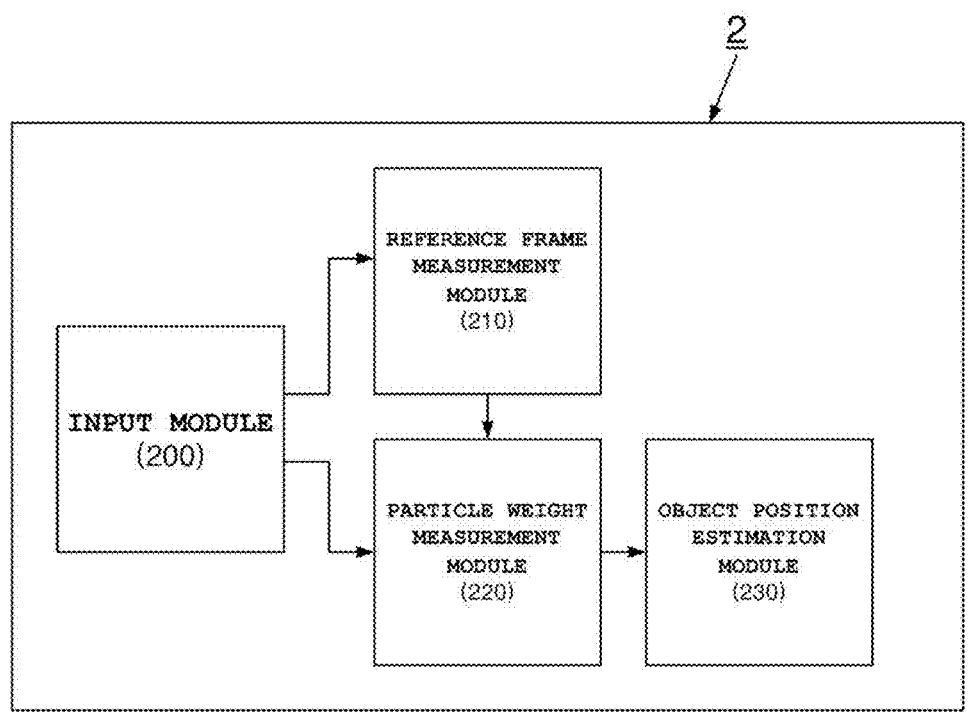
FIG. 2 is a block diagram illustrating an object tracking system according to a second embodiment of the present invention.

FIG. 2 is a block diagram schematically illustrating a configuration of an object tracking system according to a second embodiment of the present invention. Referring to FIG. 2, an object tracking system 2 according to the present invention is configured to include an input module 200, a reference frame measurement module 210, a particle weight measurement module 220, and an object position estimation module 230. The object tracking systems tracks a target object set in advance from a moving picture including frames sequentially formed.

The input module 200 receives, as an input, a moving picture to be tracked and sets a target object to be tracked by a user through a user interface module of the input module.

The reference frame measurement module 210 sets a reference frame of the moving picture input from the input module, detects the target object to be tracked by target localization in the reference frame of the moving picture, identifies the particles corresponding to the detected target object, and measures multiple histograms for at least two or more predetermined features for the particles.

The particle weight measurement module 220 selects a frame for tracking the target object from the moving picture, generates a plurality of candidate particles from the selected frame, generates multiple histograms by obtaining measurement values for at least two or more predetermined features for each of the candidate particles, selects a feature having a maximum cost among the measurement values for each of features by using the multiple histograms, and calculates a weight of the particle by using the measurement value of the selected feature.

It is preferable that, for each of the candidate particles, the particle weight measurement module obtains measurement vales for at least two or more predetermined features to generate multiple histograms, selects a feature having a maximum cost among the at least two or more features by applying the Minimax estimation technique by use the multiple histograms for the at least two on more features, and calculates a weight for the particle by using the selected feature.

It is preferable that, the particle weight measurement module obtains a Bhattacharyya Distance (BD) between the histogram of the particle in the reference frame and the histogram of the candidate particle in the frame to be tracked for each of the at least two or more features, selects a feature having a maximum BD value among the at least two or more features as the feature having the maximum cost, and calculates the weight of the corresponding particle by using the BD value of the selected feature.

On the other hand, the Bhattacharyya distance BD for a given feature $n_m$ is defined as a value obtained by squaring the Bhattacharyya similarity (BS) coefficient, and the BS coefficient can be obtained by the above-described Mathematical Formula 4.

The object position estimation module 230 estimates a position of the target object in the frame by using the weights for all the candidate particles measured by the particle weight measurement module and using Mathematical Formula 8.

Then, the object tracking system according to the present invention is repeatedly driven for all the frames constituting the moving picture to estimate the position of the target object for the entire moving picture.

Figure 3:
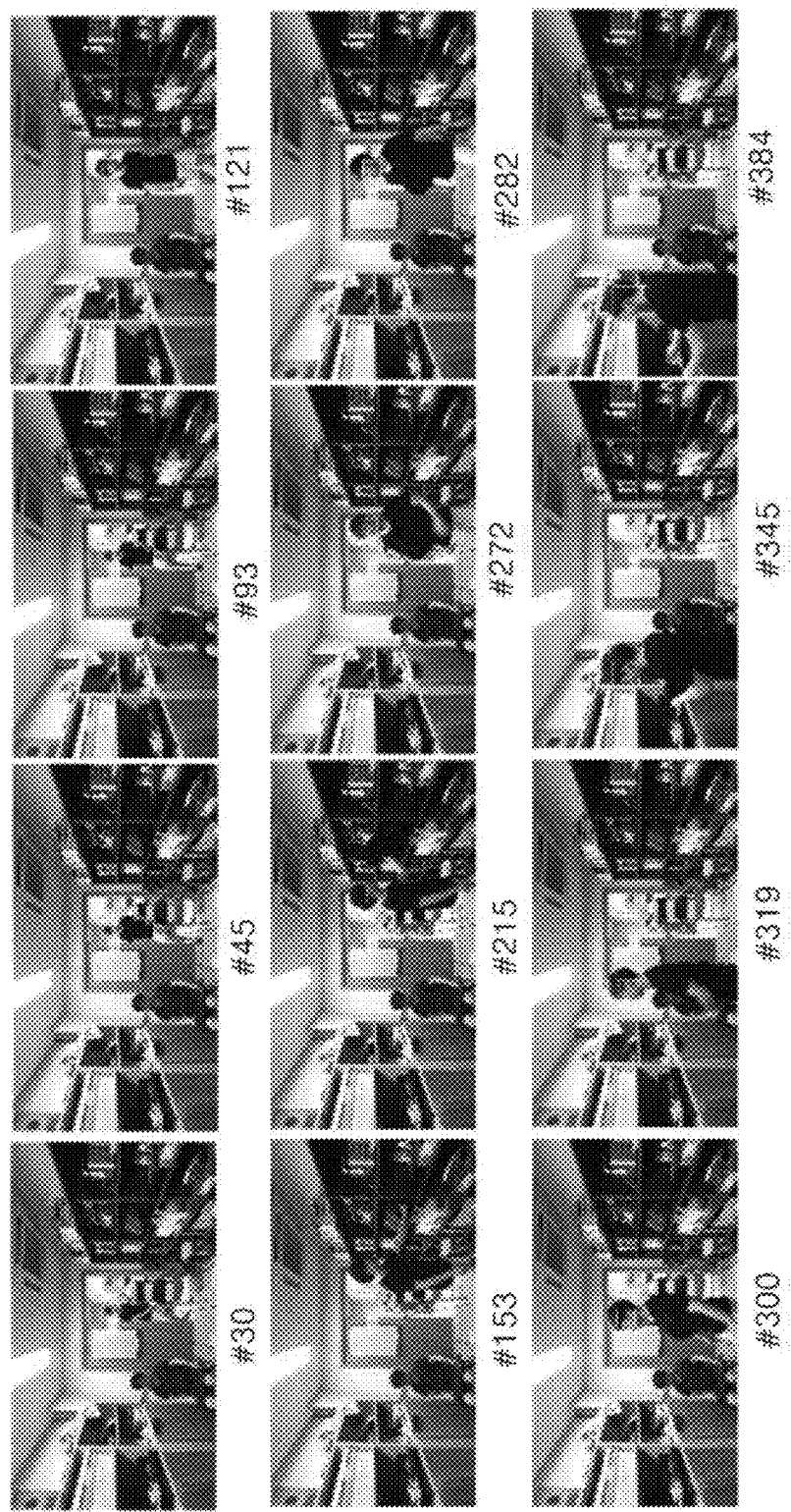
FIG. 3 is a view illustrating main frames of a test moving picture used in an experiment for evaluating the performance of the object tracking method according to the present invention, in which the numbers below are serial numbers of respective frames.

Hereinafter, the performance of the object tracking method according to the present invention is evaluated through experiments and compared with techniques in the related art. FIG. 3 is a view illustrating main frames of a test moving picture used in an experiment for evaluating the performance of the object tracking method according to the present invention, in which the numbers below are serial numbers of the respective frames.

Figure 4:
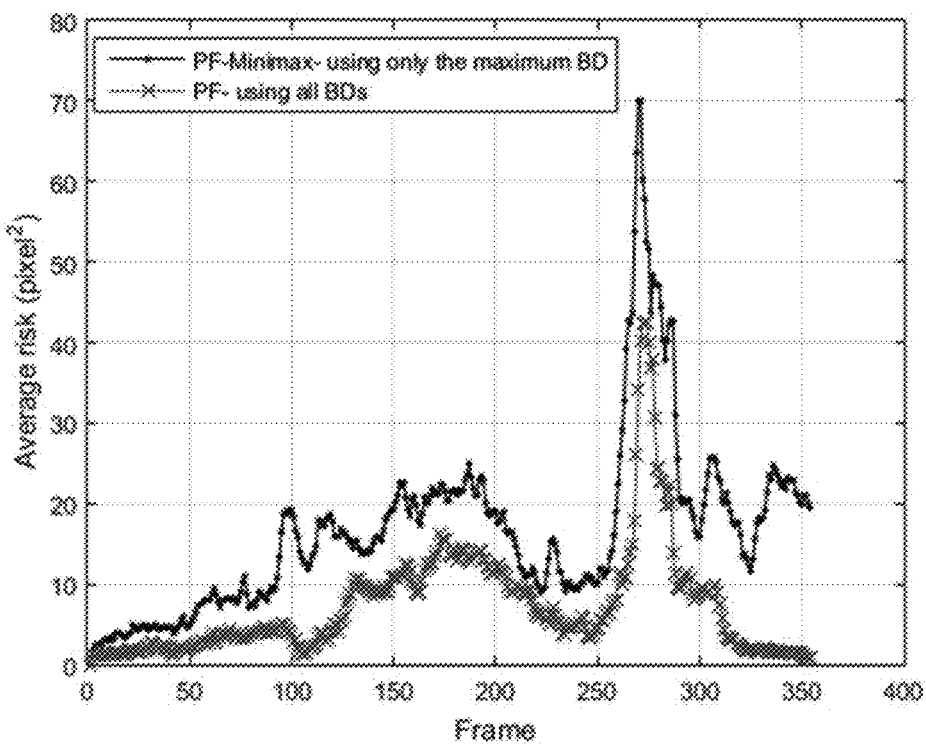
FIG. 4 is a graph illustrating results obtained by comparing values of risk functions according to the present invention and the related art.

FIG. 4 is a graph illustrating results obtained by comparing the values of the risk functions according to the present invention and the related art. The result values illustrated in FIG. 4 are the average values obtained after performing the experiment 100 times by using the moving pictures of the image frames illustrated in FIG. 3.

In the present invention, a state is estimated on the basis of the maximized risk. As illustrated in the graph of FIG. 4, it can be seen from the entire image frame of the moving picture that the average risk value according to the present invention is much larger than the average risk value according to the method in the related art. In FIG. 4, the X-axis represents a sequential image frame of a moving picture, the y-axis represents an average risk, and the unit thereof is a square of pixel, of which value is obtained by Mathematical Formula 6.

Figure 5A:
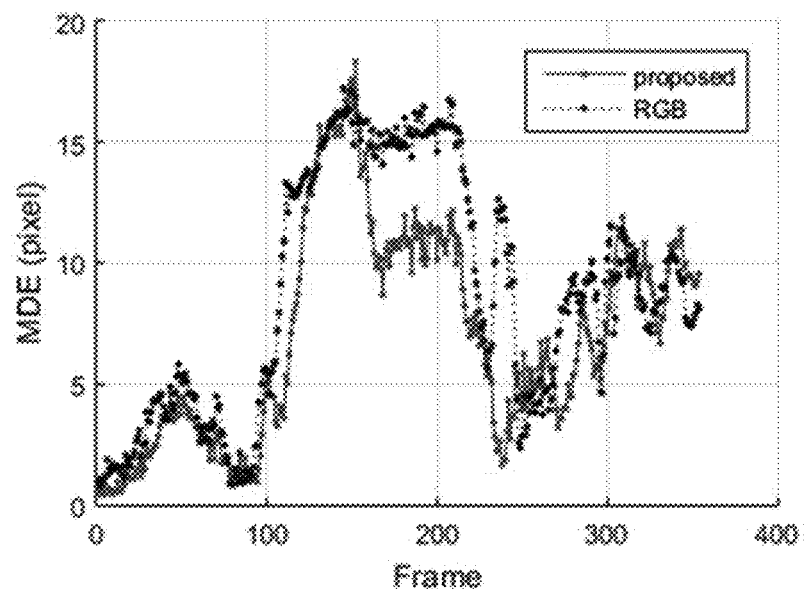
FIGS. 5A to 5D are graphs illustrating results obtained by comparing performance according to the present invention with performance according to the related art and FIGS. 6A to 6D are graphs illustrating results obtained by analyzing performance of the object tracking method according to the present invention, which include graphs obtained by comparing the case of using three features with the case of using two features.
Figure 5B:
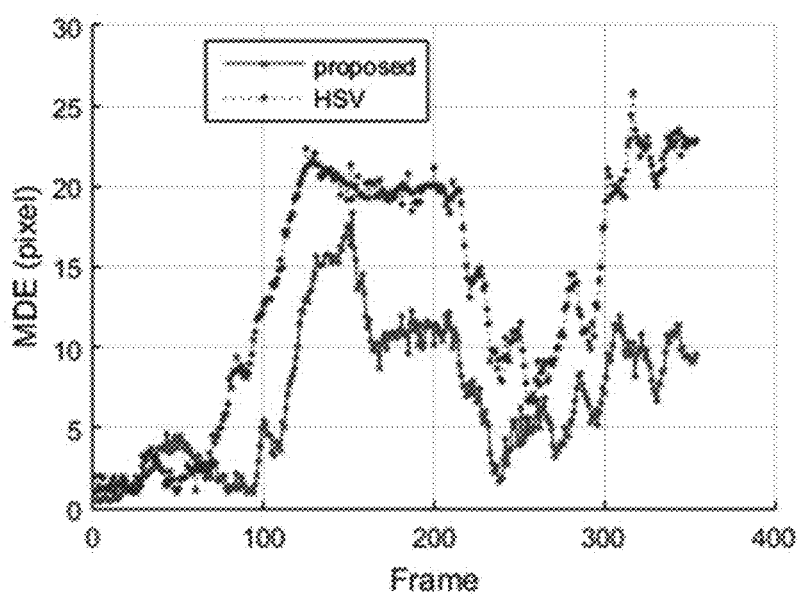
Figure 5C:
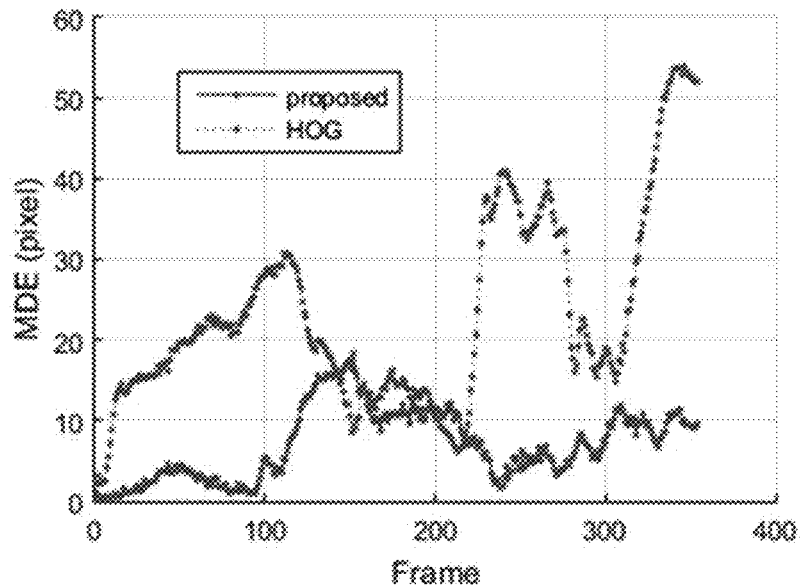
Figure 5D:
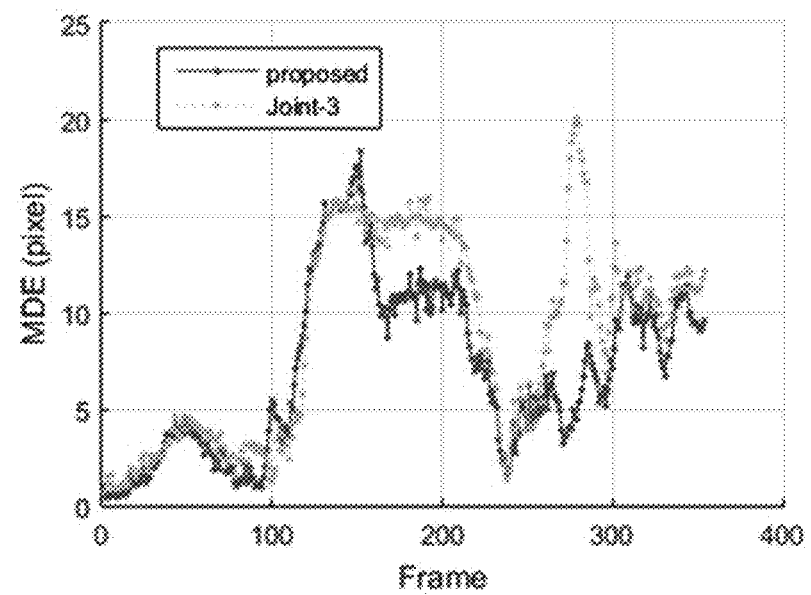

FIGS. 5A to 5D are graphs illustrating the results obtained by comparing the performance according to the present invention with the performance according to the related art. FIG. 5A is a graph illustrating a result obtained by comparing the performance according to the present invention with the performance according to the related art using a single histogram for RGB. FIG. 5B is a graph illustrating a result obtained by comparing the performance according to the present invention with the performance according to the related art using a single histogram for HSV. FIG. 5C is a graph illustrating a result obtained by comparing the performance according to the present invention with the performance according to the related art using a single histogram for HOG. FIG. 5D is a graph illustrating a result obtained by comparing the performance according to the present invention with the performance according to the related art using three histograms in a joint manner (that is, using all three features and applying a simultaneous probability method). FIGS. 5A to 5D, the y-axis represents a mean distance error (MDE) which is indicated in unit of pixel. The larger the MDE is, the larger the error is. On the other hand, the x-axis represents a sequential image of a moving picture.

It can be seen from FIGS. 5A to 5D that the object tracking method according to the present invention is superior in accuracy to the methods in the related arts.

Figure 6A:
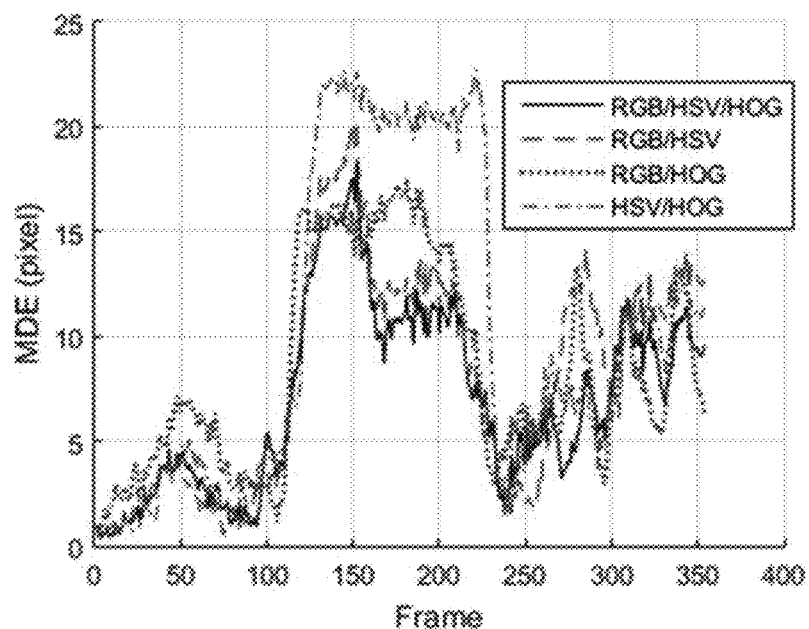
Figure 6B:
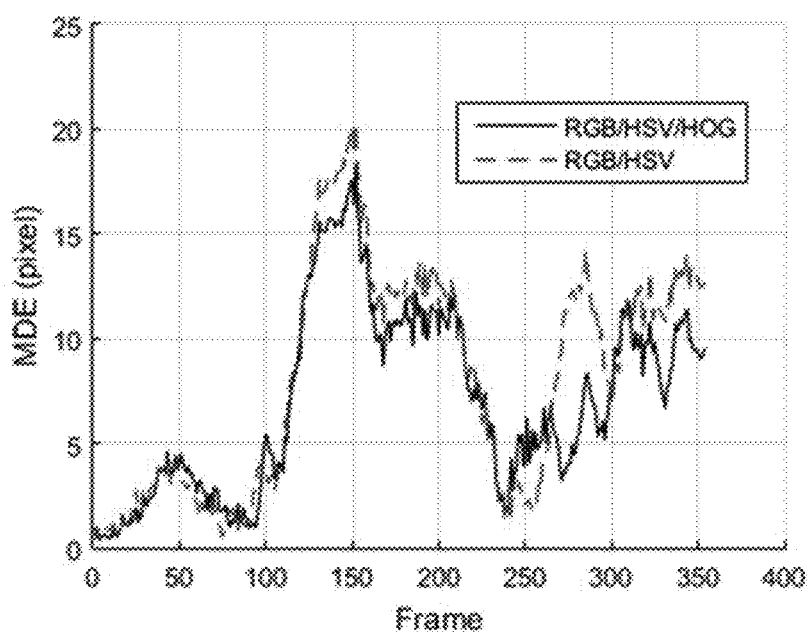
Figure 6C:
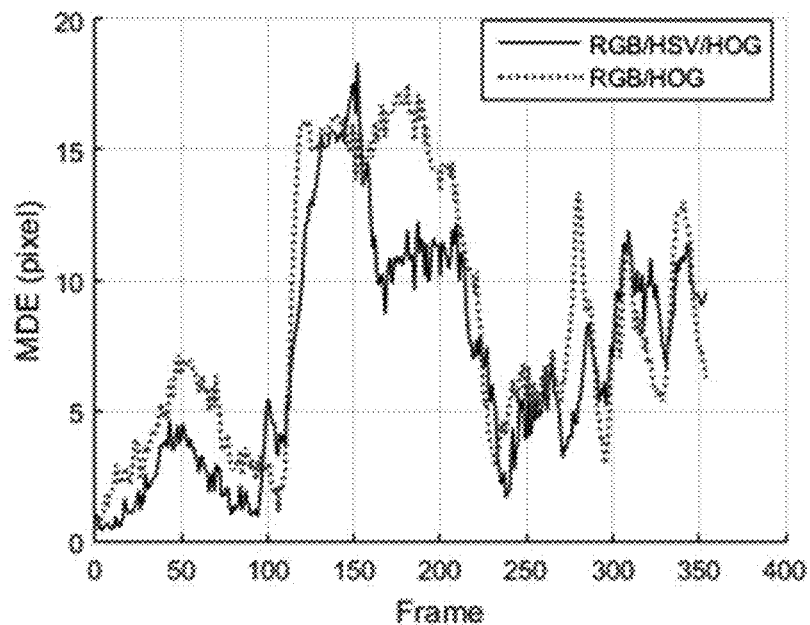
Figure 6D:
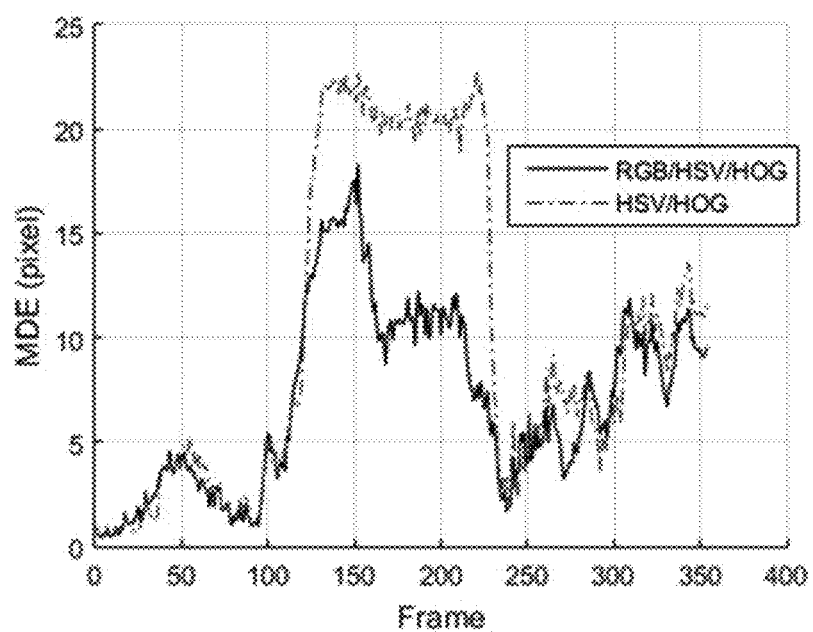

FIGS. 6A to 6D are graphs illustrating results obtained by analyzing performance of the object tracking method according to the present invention, which include result obtained by comparing the performance of the object tracking method in the case of using three features with the performance of the object tracking method in the case of using two features. FIG. 6A is a graph collectively illustrating the cases of the object tracking method according to the embodiment of the present invention using three features of RGB, HSV, and HOG, using two features of RGB and HSV, using two features of RGB and HOG, and using two features of HSV and HOG. FIG. 6B is a graph collectively illustrating the cases of the object tracking method according to the embodiment of the present invention using three features of RGB, HSV, and HOG and using two features of RGB and HSV. FIG. 6C is a graph collectively illustrating the cases of the object tracking method according to the embodiment of the present invention using three features of RGB, HSV, and HOG and using two features of RGB and HOG. FIG. 6D is a graph collectively illustrating the cases of the object tracking method according to the embodiment of the present invention using three features of RGB, HSV, and HOG and using two features of HSV and HOG.

Referring to FIGS. 6A to 6D, it can be seen that, in the object tracking method according to the present invention, in general, the object tracking using three features provides more excellent accuracy than object tracking using two features.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. An object tracking method for tracking a target object set in advance from a moving picture including consecutive frames, comprising steps of:
   (a) detecting the target object to be tracked by target localization in a reference frame of the moving picture, identifying particles corresponding to the detected target object, and measuring multiple histograms for at least two or more predetermined features for the particles;
   (b) generating a plurality of candidate particles in a frame for tracking the target object;
   (c) for each of the candidate particles, generating multiple histograms by obtaining measurement values for the at least two or more predetermined features, selecting a feature having a maximum cost among the measurement values for each feature by using the multiple histograms, and calculating a weight for the particle by using the measurement value of the selected feature; and
   (d) estimating a position of the target object in the frame by using the weights of all candidate particles obtained in the step (c).

2. The object tracking method according to claim 1, wherein the step (c) includes, for each of the candidate particles, steps of:
   (c1) generating the multiple histograms by obtaining the measurement values for at least two or more predetermined features;
   (c2) selecting the feature having the maximum cost among the at least two or more features by applying a Minimax estimation technique by using the multiple histograms for the at least two or more features; and
   (c3) calculating the weight for the particle by using the selected feature,
   wherein the weights for all the candidate particles are calculated and provided.

3. The object tracking method according to claim 2,
wherein, in the step (c2), a Bhattacharyya Distance (BD) between a histogram of the particle in the reference frame and a histogram of the candidate particle in the frame to be tracked is obtained for each of the at least two or more features, and the feature having a maximum BD value among the at least two or more features is selected as the feature having the maximum cost, and
wherein, in the step (c3), the weight of the particle is obtained by using the BD value of the selected feature.

4. The object tracking method according to claim 3, wherein the Bhattacharyya distance (BD) for a given feature $n^m$ is defined as a value obtained by squaring a Bhattacharyya Similarity (BS) coefficient, and wherein the BS coefficient $B_{nm}$ is obtained by the following mathematical formula, $$B_{n_m}(H^R_{n_m}, H_{n_m}) = \left[1 - \sum_{b=1}^{N_b} \sqrt{h^R_{b,n_m} h_{b,n_m}}\right]^{\frac{1}{2}}$$

Herein, $H^R_{nm}$, is a histogram of the feature $n_m$ for the reference frame, $H_{nm}$ is a histogram of the feature $n_m$ for the frame to be tracked, and for a given feature $n_m$, b is the serial number of a bin, $N_b$ is a total number of bins, $h_{bnm}$ is a height of a histogram for the bin, and $h^R_{bnm}$ is the height of the histogram for the bin in the reference frame.

5. An object tracking system for tracking a target object set in advance from a moving picture including consecutive frames, comprising:
an input module which receives, as an input, the moving picture to be tracked and sets the target object to be tracked;
a reference frame measurement module which sets a reference frame of the moving picture input from the input module, detects the target object to be tracked by target localization in the reference frame of the moving picture, identifies the particles corresponding to the detected target object, measures multiple histograms for at least two or more predetermined features for the particles;
a particle weight measurement module which selects a frame for tracking the target object, from the moving picture, generates a plurality of candidate particles from the selected frame, generates multiple histograms by obtaining measurement values for the at least two or more predetermined features for each of the candidate particles, selects a feature having a maximum cost among the measurement values for each of features by using the multiple histograms, and calculates a weight of the particle by using the measurement value of the selected feature; and
an object position estimation module which estimates a position of the target object in the frame by using the weights of all the candidate particles measured by the particle weight measurement module.

6. The object tracking system according to claim 5, wherein, for each of the candidate particles, the particle weight measurement module:
generates the multiple histograms by obtaining the measurement value for at least two or more predetermined features;
selects the feature having the maximum cost among the at least two or more features by applying a Minimax estimation technique by using the multiple histograms for the at least two or more features; and
calculates the weight of the particle by using the selected feature.

7. The object tracking system according to claim 6, wherein the particle weight measurement module:
obtains a Bhattacharyya Distance (BD) between a histogram of the particle in the reference frame and a histogram of the candidate particle in a frame to be traced for each of the at least two or more features, and
selects a feature having a maximum BD value among the at least two or more features as a feature having a maximum cost, and
obtains the weight of the particle by using the BD value of the selected feature.

8. The object tracking system according to claim 7, wherein the Bhattacharyya distance (BD) for a given feature $n_m$ is defined as a value obtained by squaring a Bhattacharyya Similarity (BS) coefficient, and wherein the BS coefficient B is obtained by the following mathematical formula, $$B_{n_m}(H^R_{n_m}, H_{n_m}) = \left[1 - \sum_{b=1}^{N_b} \sqrt{h^R_{b,n_m} h_{b,n_m}}\right]^{\frac{1}{2}}$$

herein, $H^R_{nm}$ is a histogram of the feature $n_m$ for a reference frame, $H_{nm}$ is a histogram of the feature $n_m$ for a frame to be tracked, and for a given feature $n_m$ b is a serial number of a bin, $N_b$ is a total number of bins, $h_{bnm}$ is a height of the histogram for the bin, and $h^R_{bnm}$ is the height of the histogram for the bin in the reference frame.

* * * * *